US008260507B2

(12) United States Patent
Schumann et al.

(10) Patent No.: US 8,260,507 B2
(45) Date of Patent: Sep. 4, 2012

(54) MANAGING APPLICATION OF AGROCHEMICALS TO PLANTS

(75) Inventors: Arnold Walter Schumann, Auburndale, FL (US); Howard Kevin Hostler, Winter Haven, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 810 days.

(21) Appl. No.: 12/353,560

(22) Filed: Jan. 14, 2009

(65) Prior Publication Data

US 2010/0179734 A1 Jul. 15, 2010

(51) Int. Cl.
*G01C 22/00* (2006.01)
*G06F 7/70* (2006.01)
*G01V 3/00* (2006.01)
*G01V 3/38* (2006.01)
*G06K 9/00* (2006.01)

(52) U.S. Cl. ............... 701/50; 701/28; 702/2; 702/5; 382/110

(58) Field of Classification Search .............. 250/206.1; 382/110; 702/2, 5; 701/28, 29, 50
See application file for complete search history.

(56) References Cited

U.S. PATENT DOCUMENTS

| | | | |
|---|---|---|---|
| 5,315,564 A | 5/1994 | Upton | |
| 5,389,781 A * | 2/1995 | Beck et al. | 250/226 |
| RE35,100 E | 11/1995 | Monson et al. | |
| 5,837,997 A * | 11/1998 | Beck et al. | 250/227.11 |
| 5,927,603 A | 7/1999 | McNabb | |
| 6,122,581 A | 9/2000 | McQuinn | |
| 6,236,916 B1 * | 5/2001 | Staub et al. | 701/29 |
| 6,336,066 B1 | 1/2002 | Pellenc et al. | |
| 6,393,927 B1 * | 5/2002 | Biggs et al. | 73/866 |
| 6,596,996 B1 * | 7/2003 | Stone et al. | 250/341.8 |
| 7,047,133 B1 * | 5/2006 | Dyer et al. | 702/5 |
| 2001/0036295 A1 * | 11/2001 | Hendrickson et al. | 382/110 |
| 2010/0249998 A1 * | 9/2010 | Holland | 700/240 |

FOREIGN PATENT DOCUMENTS

EP 1269819 1/2003

OTHER PUBLICATIONS

Zaman, et al., "Variable Rate Nitrogen Application in Florida Citrus Based on Ultrasonically-Sensed Tree Size", Applied Engineering in Agriculture, vol. 21(3), pp. 331-335, 2005 American Society of Agricultural Engineers.

(Continued)

*Primary Examiner* — James Trammell
*Assistant Examiner* — Majdi Alsomiri
(74) *Attorney, Agent, or Firm* — Fleit Gibbons Gutman Bongini & Bianco PL; Jon A. Gibbons

(57) ABSTRACT

A method, information processing system, and computer program storage product apply agrochemicals to plants. A set of user defineable agrochemical application parameters are wirelessly received from a user. A set of data is received from a multiplicity of plant sensors. The set of data includes at least positional data associated with a multiplicity of plants with respect to a set of agrochemical applicators. At least speed data associated with a vehicle coupled to the set of agrochemical applicators is received. The set of agrochemical applicators is instructed to apply one or more agrochemicals to at least one plant in the multiplicity of plants based at least on the set of user defineable agrochemical application parameters that has been wirelessly received, the set of data from a multiplicity of plant sensors, and the speed data. The set of agrochemical applicators apply the one or more agrochemicals to at least one plant.

20 Claims, 9 Drawing Sheets

OTHER PUBLICATIONS

Zaman, et al., "Performance of an Ultrasonic Tree Volume Measurement System in Commercial Citrus Groves," Precision Agriculture, ISSN 1385-2256 (print) 1573-1618 (online), pp. 467-480, Springer Netherlands, vol. 6, No. 5, Oct. 2005.

Brown, et al., "Targeted Spray Technology to Reduce Pesticide in Runoff From Dormant Orchards," ScienceDirect, Crop Protection 27 (2008), pp. 545-552.

* cited by examiner

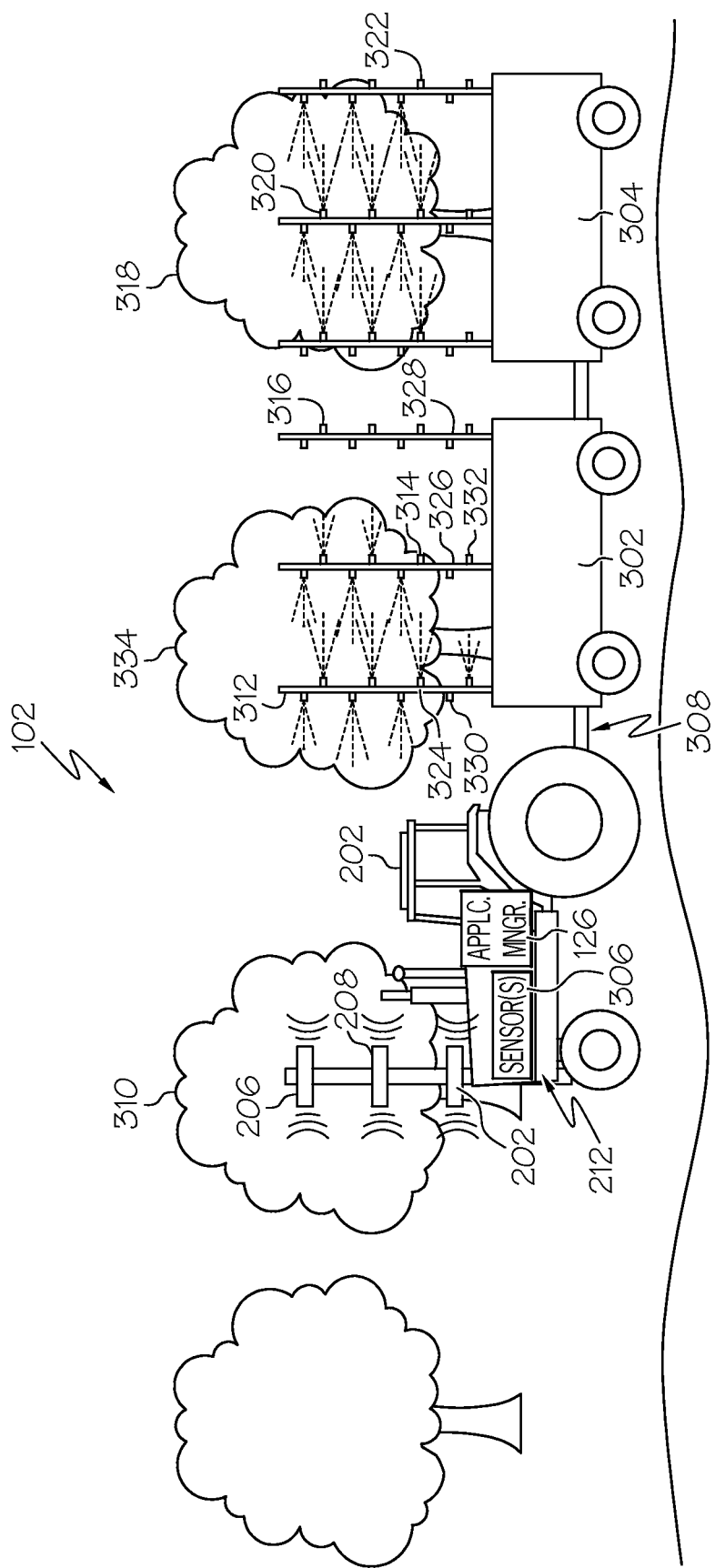

MANAGING APPLICATION OF AGROCHEMICALS TO PLANTS

FIELD OF THE INVENTION

The present invention generally relates to the field of agrochemical application, and more particularly relates to managing the application of agrochemicals to plants.

BACKGROUND OF THE INVENTION

The application of agrochemicals such as dry and/or liquid fertilizers, pesticides, herbicides, and the like to vegetation is typically performed by towing agrochemical applicators behind a tractor. Conventional variable rate agrochemical application systems generally require a tedious applicator configuration process. For example, application configuration parameters are usually entered using dual inline package ("DIP") switches, which can take long periods of time to set. Also, an operator is usually required to configure an agrochemical application system on-site at the system as compared to remotely configuring the application system.

SUMMARY OF THE INVENTION

In one embodiment, a method for applying agrochemicals to plants is disclosed. The method comprises wirelessly receiving a set of user defineable agrochemical application parameters from a user. A set of data is received from a plurality of plant sensors. The set of data includes at least positional data associated with a plurality of plants with respect to a set of agrochemical applicators. At least speed data associated with a vehicle coupled to the set of agrochemical applicators is received. The set of agrochemical applicators is instructed to apply one or more agrochemicals to at least one plant in the plurality of plants based at least on the set of user defineable agrochemical application parameters that has been wirelessly received, the set of data from a plurality of plant sensors, and the speed data. The set of agrochemical applicators apply the one or more agrochemicals to at least one plant in response to the instructing.

In another embodiment, a system for applying agrochemicals to plants is disclosed. The system comprises at least one vehicle, a plurality of plant sensors that is mechanically coupled to the vehicle, and a set of vehicle sensors that is mechanically coupled to the vehicle. The system also includes a plurality of agrochemical applicators that are mechanically coupled to the vehicle and communicatively coupled to the plurality of plant sensors and an applicator manager that is communicatively coupled to the plurality of plant sensors and the plurality of agrochemical applicators. The applicator manager is adapted to wirelessly receive from a user a set of user defineable agrochemical application parameters. The set of data received from the plant sensors includes at least positional data associated with a plurality of plants with respect to a set of agrochemical applicators. At least speed data associated with a vehicle coupled to the set of agrochemical applicators is received. The set of agrochemical applicators is instructed to apply one or more agrochemicals to at least one plant in the plurality of plants based at least on the set of user defineable agrochemical application parameters that has been wirelessly received the set of data from a plurality of plant sensors, and the speed data. The set of agrochemical applicators apply the one or more agrochemicals to at least one plant in response to the instructing.

In yet another embodiment, a computer program storage product for applying agrochemicals to plants is disclosed. The computer program storage product comprises instructions for wirelessly receiving a set of user defineable agrochemical application parameters from a user. A set of data is received from a plurality of plant sensors. The set of data includes at least positional data associated with a plurality of plants with respect to a set of agrochemical applicators. At least speed data associated with a vehicle coupled to the set of agrochemical applicators is received. The set of agrochemical applicators is instructed to apply one or more agrochemicals to at least one plant in the plurality of plants based at least on the set of user defineable agrochemical application parameters that has been wirelessly received, the set of data from a plurality of plant sensors, and the speed data. The set of agrochemical applicators apply the one or more agrochemicals to at least one plant in response to the instructing.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 shows a detailed view of an agrochemical application system according to one embodiment of the present invention;

FIGS. 4-5 show various examples of an applicator control interface on a wireless device according to one embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Operating Environment

Figure 1:
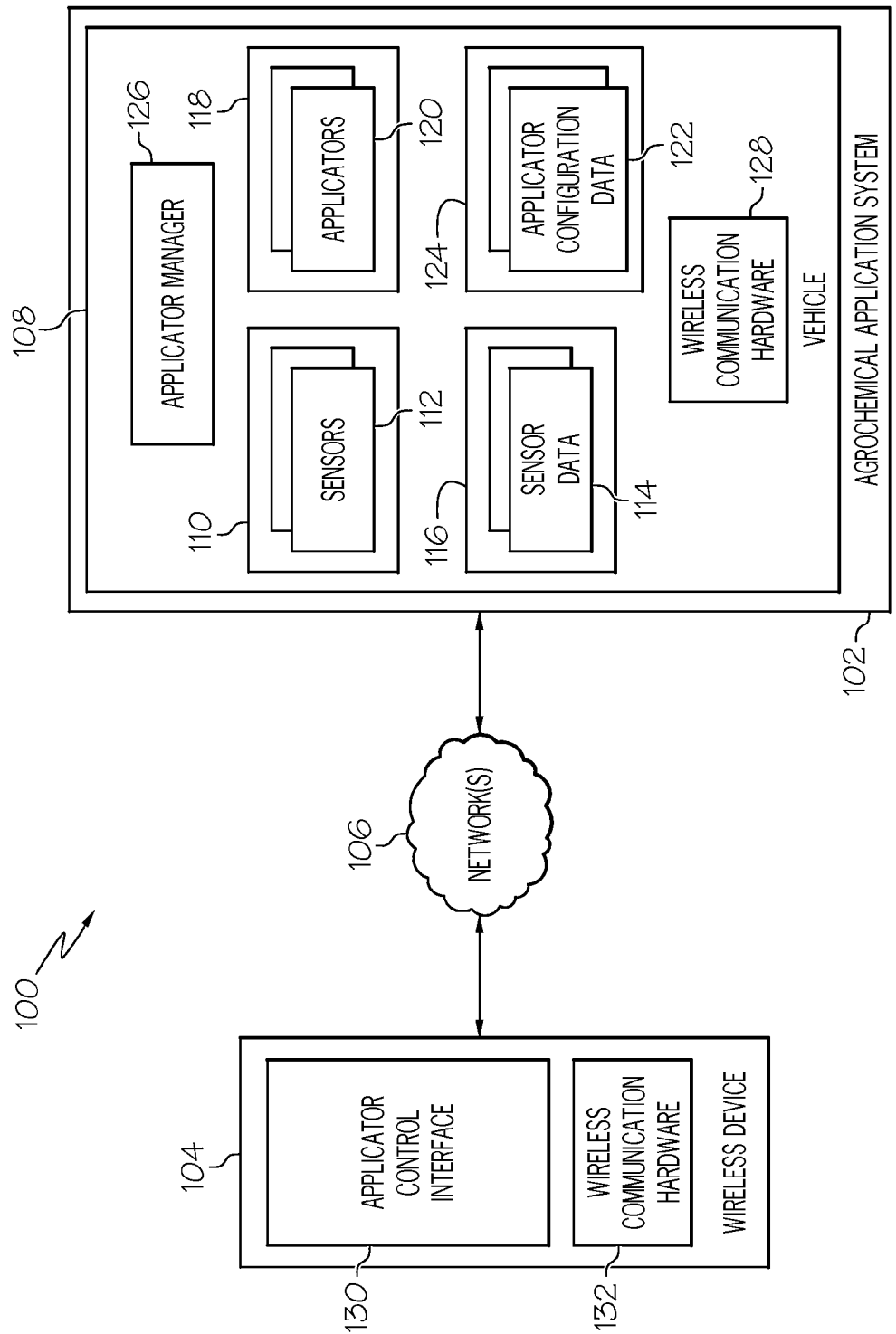
FIG. 1 is a block diagram illustrating one example of an operating environment according to one embodiment of the present invention.

According to one embodiment of the present invention, as shown in FIG. 1, a system 100 for wirelessly configuring an agrochemical application system 102 is shown. In particular, FIG. 1 shows an agrochemical application system 102 communicatively coupled to one or more wireless devices 104 via a network(s) 106. In one embodiment, the network 106 is a wireless network established between the agrochemical application system 102 and the wireless device 104 using one or more short range wireless technologies such as (but not limited to) Bluetooth, WiFi, or Zigbee. However, it should be noted that the network 106 is not limited to a short range radio network. For example, long range wireless technologies are also applicable to the various embodiments of the present invention such as (but not limited to) an Evolution Data Only ("EV-DO") network, a General Packet Radio Service ("GPRS") network, a Universal Mobile Telecommunications System ("UMTS") network, a 802.16 (WiMax) network, and the like.

The agrochemical application system 102, in one embodiment, comprises a vehicle 108 such as a tractor, a truck, an all-terrain vehicle, a car, or any other motorized vehicle. The vehicle 108 is coupled to one or more applicator units 302, 304 (FIG. 3) that is disposed behind the vehicle 108, as shown in FIG. 3. The agrochemical application system 102 comprises a plurality 110 of sensors 112. A first set of sensors in the plurality 110 of sensors 112 are vegetation sensors that detect vegetation and the position of the vegetation with respect to the agrochemical application system 102. A second set of sensors in the plurality 110 of sensors 112 are vehicle sensors such as location sensors and/or speed sensors. Sensor data 114 such as vegetation position data, vehicle speed data, and the like collected from each sensor 112 is stored in one or more storage devices 116. The sensors 112 and sensor data 114 are discussed in greater detail below.

The agrochemical application system 102 also comprises a plurality 118 of applicators 120 A ... Z that apply one or more agrochemicals such as dry and/or liquid fertilizers, pesticides, herbicides, and the like to detected vegetation. Applicators 120 A ... Z can include solenoid valves, actuators, and/or any other mechanisms that control the flow of agrochemicals out through a nozzle. Each applicator 120 in the plurality 118 of applicators is associated with a set of applicator configuration data 122 that is stored in one or more storage devices 124. Applicator configuration data 122, in one embodiment, controls the rate at which the applicators 120 A ... Z dispense the agrochemicals, indicates the time at which the applicators 120 A ... Z dispense the agrochemicals, indicates which applicators 120 A ... Z are to dispense the agrochemicals and when, the sequence of dispensing, and the like. The applicators 120 A ... Z and the applicator configuration data 122 are discussed in greater detail below.

The agrochemical application system 102 further comprises an applicator manager 126 that manages the agrochemical application system 102. For example, the applicator manager 126 manages the sensor data 118 and/or the applicator configuration data 122 to instruct the applicators 120 A ... Z situated on one or more applicator units (FIG. 3) when and how to dispense agrochemicals onto plants. Stated differently, the applicator manager 126 can act as a variable rate controller for variably controlling the application of agrochemicals to plants. The applicator manager 126, in one embodiment, also generates and/or updates applicator configuration data 122 based on the sensor data 118 and/or data received from a human operator via the wireless device 104. The agrochemical application system 102 also includes wireless communication hardware 128 such as the short range radio or long range radio technologies discussed above for communicating with the wireless device 104 via the network(s) 106. The applicator manager 126 is discussed in greater detail below.

The wireless device 104, in one embodiment, can include (but is not limited to) any one or a combination of the following: a personal digital assistant ("PDA"), a cellular telephone, a mobile phone, a smartphone, a two-way radio, a two-way pager, a wireless messaging device, a laptop/computer, a portable music device such as (but not limited to) an iPod, an electronic device running operating systems such as (but not limited to) the Windows Mobile®, Google's Android, and/or Linux operating systems, and the like. The wireless device 104, in one embodiment, includes an applicator control interface 130 for wirelessly communicating with the applicator control manager 126 of the agrochemical application system 102 via wireless communication hardware 132.

The applicator control interface 130, in one embodiment, is an application or website that allows a human operator to enter applicator configuration data 122, enter sensor configuration data, control multiple/individual applicators 120, and the like. This information is then communicated to the agrochemical application system 102 via the network 106. The applicator control manager 126 receives this information and can then use the received sensor configuration data to configure the sensors 112; store the received applicator configuration data 122 in the corresponding storage device 124; generate additional applicator configuration data 122 based on the applicator configuration data received from the operator; control the applicators 120; and the like.

The applicator control interface 130 can also display information received from the agrochemical application system 102. For example, the applicator manager 126 can send vehicle speed data and/or positional data; applicator status information; vegetation sensor information, detected vegetation information, and the like to the wireless device 104 via the network 106. This information is then displayed to the operator via the applicator control interface 130. The applicator control interface 130 is discussed in greater detail below.

Managing the Application of Agrochemicals to Vegetation

Figure 2:
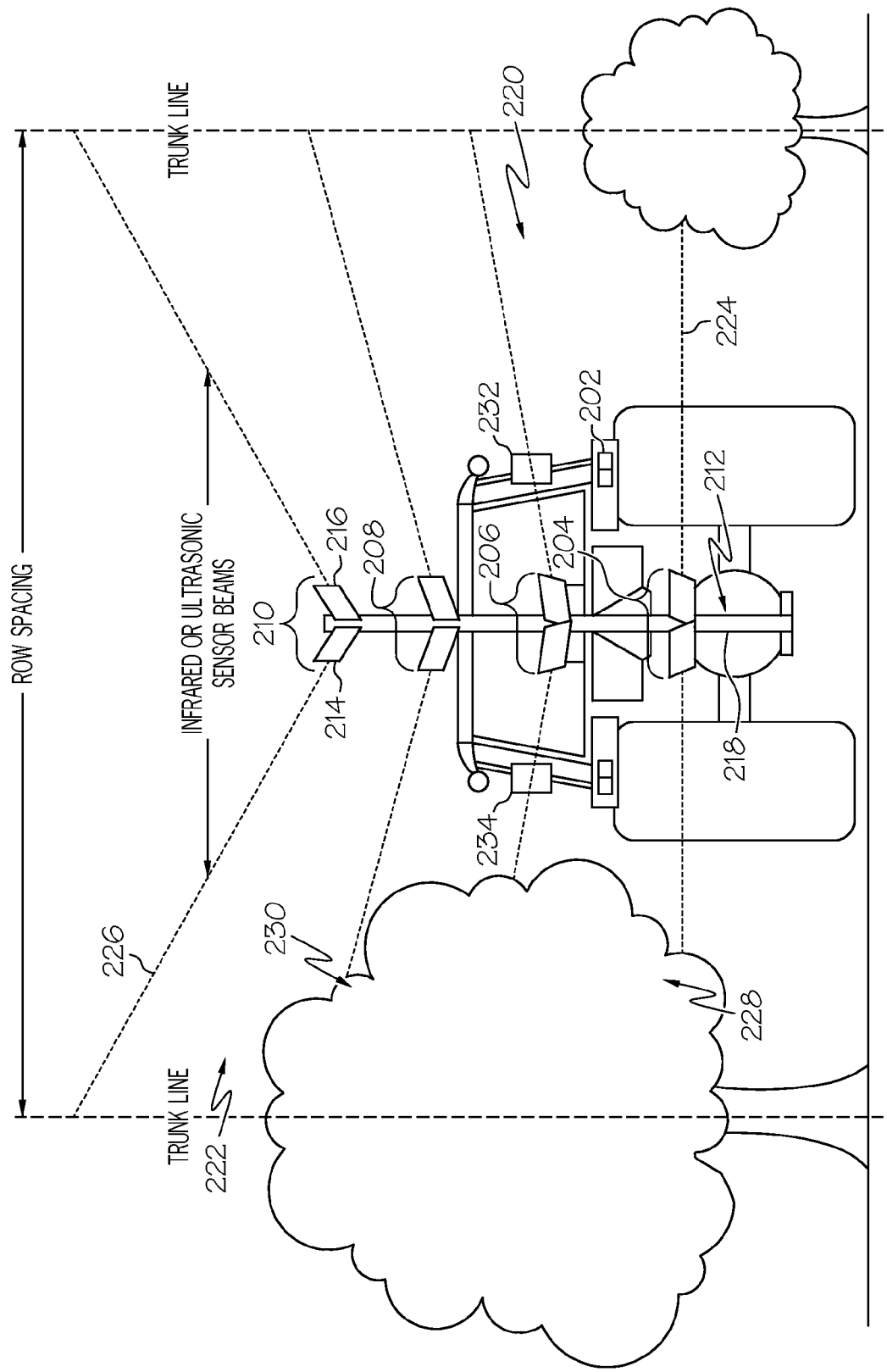
FIG. 2 shows one example of vegetation sensor placement in an agrochemical application system according to one embodiment of the present invention.

FIG. 2 shows one example of vegetation sensor placement with the agrochemical application system 102. In particular, FIG. 2 shows a vehicle 202 such as a tractor. The vehicle 208 is coupled to one or more application units 302, 304 such as those shown in FIG. 3. In one embodiment, a multiple sets 204, 206, 208, 210 are disposed in a vertical configuration on a front portion 212 of the vehicle 202. In one embodiment, the sets of sensors 204, 206, 208, 210 each comprise a first sensor 214 and a second sensor 216 situated adjacent to each other (but are not limited to an adjacent configuration) are disposed at given distances from each other. For example, FIG. 2 shows four sets of sensors 204, 206, 208, 210 disposed in a vertical configuration on a bar/rod like structure 218. In one embodiment, ultrasonic and/or photoelectric transducers are used as the sensors. However, any sensors that emit or receive ultrasonic, infrared, laser, microwaves, and the like can be used as well.

As discussed above, each sensor set comprises a first sensor and a second sensor. In one embodiment, one of the sensors provides a left field of view 220 and the other sensor provides a right field of view 222. It should be noted that the sensors 214, 216 can be configured to provide any field of view range from 0-360 degrees. For example, each sensor or each sensor set can be configured to with a different field of view of substantially similar fields of view. As can be seen in FIG. 2 a first sensor set 204 situated closest to the ground has a different field of view than the top most sensor set 210, as shown by the dashed line sets 224, 226. Having varying fields of view between the sensor sets allows the beginning (e.g., the bottom most portion 228) and the end (e.g., the top most portion 230) of a plant canopy to be detected. Stated differently, the sensors can be arranged so that they detect different portions of the canopy and can therefore collect data that the applicator manager 126 can use to estimate the height classes of canopies. The data collected by the sensors is stored as sensor data 114 in one or more storage devices 116 discussed above.

Having the sensors sets 204, 206, 208, 210 disposed on the front portion 212 of the vehicle 202 provides a "look ahead" configuration where vegetation and its properties (e.g., where the canopy starts and ends, density, size, and the like) is detected prior to the application units of the agrochemical application system 102 reaching the vegetation. It should be noted that the various embodiments of the present invention are not limited to disposing sensor sets in a vertical configuration or disposing the sensor sets on a front portion 212 of the vehicle 202. For example, the sensor sets 204, 206, 208, 210 (which can comprise any number of sensors) can also be disposed using a horizontal configuration with respect to the ground instead of or in addition to the vertical configuration shown in FIG. 2. Also, the sensor sets 204, 206, 208, 210 can be disposed one or more sides 232, 234 of the vehicle 202 and/or the rear portion (i.e., the portion closest to the application units (not shown in FIG. 2)) of the vehicle 202 instead of or in addition to disposing the sensor sets on the front portion 212 of the vehicle 202.

One advantage of this "look ahead" configuration is that vegetation can be detected prior to the application units 302, 304 reaching the vegetation. This allows the applicator manager 126 to configure the applicators 120 A . . . Z to dispense an optimized amount of agrochemical and dynamically configure the application process to take into account vegetation parameters such as size, density, position, etc. detected by the sensors sets 204, 206, 208, 210 and dynamically respond to environmental factors such as wind to provide optimum application of agrochemicals to the plants.

Also, by configuring the placement of the sensors as discussed above, the vegetation canopies can be identified such that one or more of the applicators 120 A . . . Z can be controlled such that agrochemicals are not applied where vegetation does not exist. For example, the sensors are able to detect that a plant does not exist at a particular location. Therefore, the applicator manager 126 instructs one or more applicators 120 A . . . Z to not apply agrochemical at that location when those sensors pass that location. Also, the sensors may determine that a canopy of a particular tree may start 15 ft in the air, so the applicator manager 126 instructs only the applicators corresponding to the 15 ft position and above to apply agrochemicals. These features prevent agrochemicals from being unnecessarily wasted and also save the environment from being unnecessarily contaminated.

FIG. 3 shows another view of the agrochemical application system 102. In particular, FIG. 3 shows the vegetation sensors 204, 206, 208, coupled to a front portion 212 of the vehicle 202. One or more vehicle sensors 306 are coupled to the vehicle as well. In one embodiment, the vehicle sensor 306 detects ground speed that is obtained in real time using a sensors such as (but not limited to) Wide Area Augmentation System ("WAAS") units and/or differential Global Positioning Satellite ("DPGS") units. However, any sensor capable of determining the speed of a vehicle 202 is also applicable to the various embodiments of the present invention as well.

A plurality of application units 302, 304 are coupled to a rear portion 308 of the vehicle. As discussed above, the plurality of vegetation sensors 204, 206, 208 detect vegetation 310 and its properties as the moves towards the vegetation 310 prior to the applicator units 302, 304 reaching the vegetation 310. Based on the sensor data 114, which comprises data from the vegetation sensors 204, 206, 208 and data from the vehicle sensors 306 such as vehicle speed and/or position, and user defineable parameters that have been wirelessly received from an operator's handheld device 104 the application manager 126 can separately, automatically, and variably control each applicator unit 302, 304, each applicator 312, 314, 316, 318, 320, 322 on each applicator unit 302, 304, and/or one or more sets of applicators on one or more applicator units 302, 304.

For example, FIG. 3 shows multiple applicators 312, 314, 316, 318, 320, 322 on each applicator unit 302, 304 coupled to the vehicle 202. As the vegetation sensors 204, 206, 208 and vehicle sensors 306 communicate their data to the applicator manager 126, the applicator manager 126 retrieves any user defineable parameters and generates applicator specific instructions that instruct one or more applicators 312, 314, 316, 318, 320, 322 if and when to dispense agrochemicals, how much agrochemical to dispense, dispensing pattern, dispensing pressure, and the like. For example, FIG. 3 shows that a first and second sets 324, 326 of applicators on the first applicator unit 302 have applicators that are applying agrochemical(s) to a first tree while a third set of applicators 328 does not have any applicators applying agrochemicals because these applicators are not within range of any vegetation. Even further, one or more applicators 330, 332 within the first and second set of applicators 324, 326 have been instructed to not apply any agrochemicals because these particular applicators are not within range of the current tree 334 being processed. The above discussion also applies to the second applicator unit 304 as well.

The following is a more detailed discussion managing the applicators as discussed above. As the vegetation sensors 204, 206, 208, 210 scan an area for vegetation 310 and its properties such as location, size, density, and the like the generated sensor data 114 is stored in one or more storage devices 116. In one embodiment, the applicator manager 126 accumulates sensor data readings into a single reading to prevent narrow sensor beams from turning off at times when they pass through gaps in the tree canopy. The applicator manager 126 analyzes the vegetation sensor data to identify when/where vegetation has been detected. In one embodiment, any non-zero total in the sensor data indicates that a tree canopy has been sensed and the applicator manager effectively "fills in" the gaps in the sensed canopy by magnifying the detected canopy regions by a factor of 20 or other suitable total count. There is no discrimination for the magnitude of this total nonzero value. A zero value indicates that a tree canopy has not been detected by that particular sensor during the previous given number of scan cycles. It should be noted that although a tree canopy was used as one type of vegetation being detected, the various embodiments are application to any type of vegetation.

Figures 4, 5:
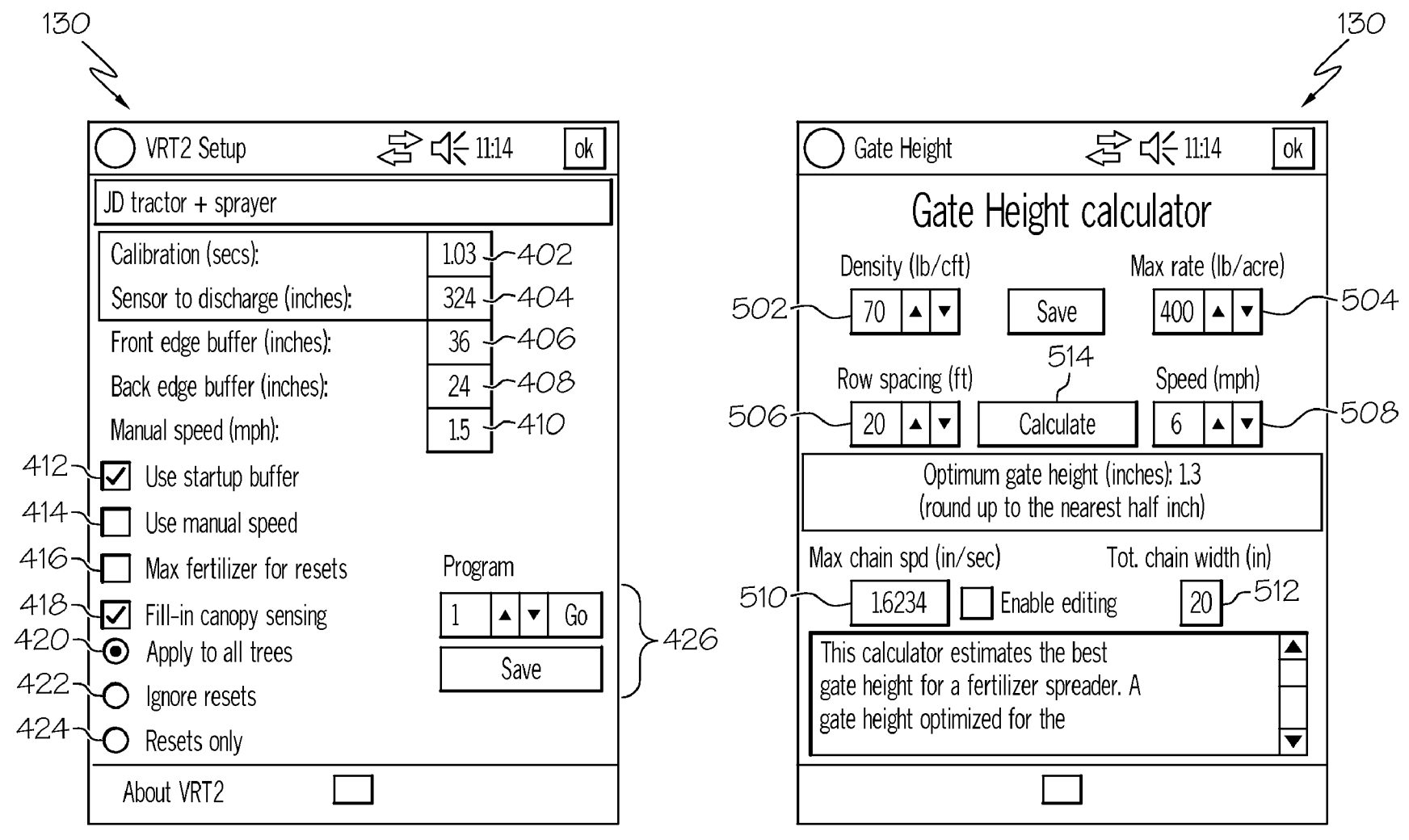

In addition to the vegetation sensor data, human operators can also wirelessly transmit user defineable parameters to the agrochemical application system 102 as well. For example, an operator can enter one or more user defineable parameters into the wireless device 104 via the applicator control interface. FIGS. 4-5 show examples of the applicator control interface 130 and various applicator control parameters that can be defined by the operator at the wireless device 104. In particular, FIG. 4 shows an applicator calibration parameter 402, a sensor-to-discharge parameter 404, a front edge buffer parameter 406, a back edge buffer parameter 408, and a manual speed parameter 410. It should be noted that the present invention is not limited to these parameters. One or more of these parameters can be deleted and/or one or more additional parameters can be added as well.

The applicator calibration or latency parameter 402 allows the user to indicate how much time before an applicator 120 reaches an application point on a particular plant 334 the applicator manager 124 is to instruct the applicator(s) 120 to begin dispensing the agrochemical. For example, it may take the applicators 1.03 seconds to dispense the agrochemical once instructed to do so as a result of processor speed, actuator/solenoid delay, and the like. Therefore, FIG. 4 shows that the user has entered/selected 1.03 seconds as the applicator calibration or latency parameter 402. This ensures that the applicators 120 A . . . Z dispense the agrochemicals at the precise location where they are needed. It will be understood by those of average skill in the art, that a camera taking a series of high speed photos can be used to help determine the latency parameter 402. In one embodiment, the camera (not shown) is part of the handheld device 104.

The sensor-to-discharge or offset parameter 404 indicates the distance from one or more applicators/applicator units to the plurality of sensors. The edge buffer parameters 406, 408 allow the operator to enter a distance required before (e.g., front buffer) and after (e.g., back buffer) each tree so that agrochemical overlaps sufficiently around the tree target. Buffers 406, 408 are particularly useful for pesticide sprayers in order to compensate for spray drift in a fixed direction. Therefore, a user can compensate for environmental factors such as wind and use the edge buffers to ensure that the applicators 120 A . . . Z overlap their dispensing patterns such the target plant 334 receives an optimal amount of agrochemical. It should be noted that an environmental meter such as a wind meter (not shown) can be communicatively coupled to the wireless device 104 or the application manager to provide environmental conditions. These conditions can be used by the operator or the application manager 126 to determine the edge buffer parameters 406, 408. For example, the applicator manager 126 can automatically determine the edge buffers 406, 408 based on the information received from the environmental meter.

The manual speed parameter 410 is used as backup data when a vehicle sensor 306 such as a GPS ground speed sensor fails. In other words, an operator is able to manually enter the speed of the vehicle 202. The startup buffer 412 is an option that the operator can select which activates one or more of the applicators 120 A . . . Z from the moment the vehicle 202 starts moving forward, until the distance equivalent to the length of the entire agrochemical application system 102 (e.g., the vehicle plus any applicator units) is reached. This option ensures that trees not yet receiving "look ahead data" (e.g., the vegetation sensor data) from the system still receive the agrochemical application. For example, the agrochemical application system 102 may be started when the system is already next to or passed plants. These plants may be behind the vegetation sensors, and therefore are not detected. By selecting the startup buffer option 412, the operator can manually initiate one or more of the applicators 120 A . . . Z so that these undetected plants receive the agrochemicals. In one embodiment, it takes about the length of the agrochemical application system 102 to reach a steady state in the look ahead buffer 114 and GPS ground speed.

The "use manual speed" option 414 instructs the applicator manager 126 to use the manual speed parameter 410 discussed above. The "max. fertilizer for resets" option 416 is used to boost the fertilizer delivered to the smallest trees in order to compensate for their small horizontal canopy size, which can limit detection by the sensors 112, and because they have a much smaller and less efficient root system than mature trees. Therefore, when an operator selects this option and the vegetation sensors 204, 206, 208, 210 have detected a plant with a size smaller than a given threshold the applicators apply an additional given amount of agrochemical to these smaller plants.

The "Fill-in canopy sensing" option 418 prevents tree sensors from being turned off when canopy gaps are encountered in the lower canopy. For example, in one embodiment, the upper sensors have priority over any lower sensors so that they override the lower sensors when tree canopy is detected. Therefore, when an operator selects the "Fill-in canopy sensing" option 418 the applicator manager 126 and a gap is detected in a lower portion of a tree canopy the applicator manager "fills" in the gaps so that the applicators still dispense agrochemicals in those locations. The applicator control interface 130 also allows the operator to activate selective application of agrochemicals to only the smallest trees (resets) detected by the lowest sensors, or by exclusion, to only the larger trees that trigger more than just the lowest sensors by selecting one or more additional options 420, 422, 424.

FIG. 4 also shows that an operator can save his/her inputs/settings under one or more programs 426. This is useful when the agrochemical system utilizes a variety of different applicator units. Each system configuration can be associated with a different user definable program. When the configuration of the system changes, the operator only has to select a saved program (if available) as compared to having to renter all the settings manually.

FIG. 5 shows another example of the applicator control interface 130. In particular, FIG. 5 shows a gate height calculation screen. Since the correct gate height or "gap" where the fertilizer in a variable rate spreader leaves the hopper is crucial to its proper calibration and performance, it should be estimated and adjusted every time that the spreader is used. However the calculation involves up to six independent variables, as shown on the screen in FIG. 5, and is not easily computed on a handheld calculator or computer spreadsheet. The gate height calculator screen is a custom software program designed to make the calculation very easy. The user simply edits the appropriate variables 502, 504, 506, 508, 510, 512 to match those being used for the day; typically fertilizer density 502, the maximum fertilizer rate 504, row spacing 506 in the orchard, and ground speed 508. The correct gate height is then obtained by clicking on the "calculate" button 514.

All of the parameters/setting discussed above with respect to FIGS. 4 and 5 are wirelessly transmitted from the wireless device 104 to the agrochemical application system 102 via the network 106. The applicator manager 126 then stores these received parameters/settings as applicator configuration data 122 in one or more storage devices 124, as discussed above. As the vehicle 108 begins to move, the applicator manager 126 retrieves vegetation sensor data 114 and stores this data into a data buffer array 602. The applicator manager 126 also obtains ground speed data 114 associated with the vehicle 202 directly from one or more of the vehicle sensors 306 or the one or more storage devices 116. The data buffer array 602 can be implemented in hardware, software or a combination of both.

The applicator manager 126 also retrieves one or more user defined parameters such as applicator calibration values 402, sensor-to-discharge distance 404, and the like. The applicator manager 126 then determines in software an array index for the buffer 602 so that the correct sensor can be read from the buffer array 602. In other words, because the sensors are "looking ahead" of the applicators 120, the sensor data 114 is indexed so that the applicators 120 A . . . Z can be activated when they reach position corresponding to the sensor data 114. In one embodiment, the array index is calculated as follows: Array_index=((offset ml speed m s$^{-1}$)−latency s)×42 s$^{-1}$ (EQ 1), wherein offset is the "sensor-to-discharge" parameter 404 in FIG. 4, speed is the speed of the vehicle 202, and latency is the "applicator calibration" parameter 402 in FIG. 4. The quantity of "42" results from an example where the application manager 126 scans binary output from the sensors using an eight-bit input register at 850 Hz and accumulates every 20 readings to product a time-smoothed 42 Hz result. Therefore, the quantity "42" refers to this 42 Hz result. It should be noted the quantity of "42" is only exemplary and can be changed depending on the system configuration as needed.

Figure 6:
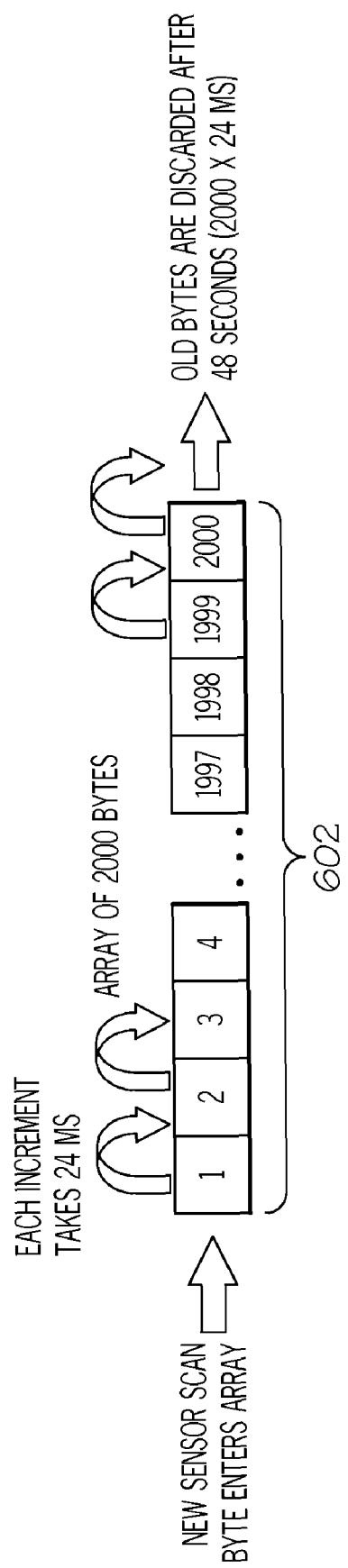
FIG. 6 is a block diagram illustrating one example of a buffer array for storing vegetation sensor information according to one embodiment of the present invention.

FIG. 6 shows an example of the buffer data array 602. Each position in the array comprises data from all of the vegetation sensors 204, 206, 208, 210 and FIG. 6 shows an example where the array is 2000 bytes. If 8 eight sensors are being used then, in this example, each array position comprises 1 byte having 1 bit for each sensor for a total of 8 bits per 1 byte. FIG. 6 shows that each array increment takes 24 ms, which results in old bytes being discarded after 48 seconds (2000×24 ms). It should be noted that 24 ms is only one example of how long a cycle of the application manager 126 takes and any other number is applicable to the various embodiments of the present invention as well. Using (EQ 1) above, the applicator manager 126 determines a new array index every 24 ms so that it can determine the correct sensor byte to read from the buffer array 602. The correct sensor byte is then used by the applicator manager 126 to actuate each of the applicators 120 A . . . Z corresponding to plant(s) associated with that sensor byte.

One example of calculating an array index is as follows: offset=8.3 m, speed=0.67 m/s, latency=1.0 s, using (EQ 1) results in ((8.3/0.67)−1)*42=an array position of 478. With a cycle time of 24 ms an array position of 478 corresponds to 11.47 s (478×24 ms). Therefore, based on the current ground speed and the applicator units being utilized, the applicator manager has determined that in 11.47 s the applicators corresponding to vegetation associated with the sensor data for array position 478 are activated. Stated differently, the application manager 126 determines the correct time delay for dispensing the agrochemical using (EQ 1) for the particular application unit being used and the ground speed at that time. It should be noted that the edge buffer distances 406, 408 entered by the user are incorporated into the offset parameter discussed above.

Once the array index has been determined as discussed above, the application manager 126 retrieves any parameters received from the user. For example, parameters such as manual overrides from one or more toggle switches 1014 controlling left and right sensor banks on a controller box, user-defined target sizes 420, 422, 424, startup buffer 412, max fertilizer for resets 416 or fill-in canopy sensing 418, and the like can be received form the user. The manual overrides and parameter data 420, 422, 424, 412, 416, 418 are used to modify a current indexed byte in the buffer 602. For example, the current indexed byte is altered so that the bits corresponding to lower canopy sensors are changed from "0" to "1" if overridden by upper canopy sensors with bits equal to "1" and if requested by the fill-in canopy sensing parameter 418. In one embodiment, the lag time, offset and canopy buffers are already incorporated into the EQ. 1 calculation when the array index is determined, but this is not required. The applicators 120 A . . . Z are then activated according to the new byte data.

Figure 7:
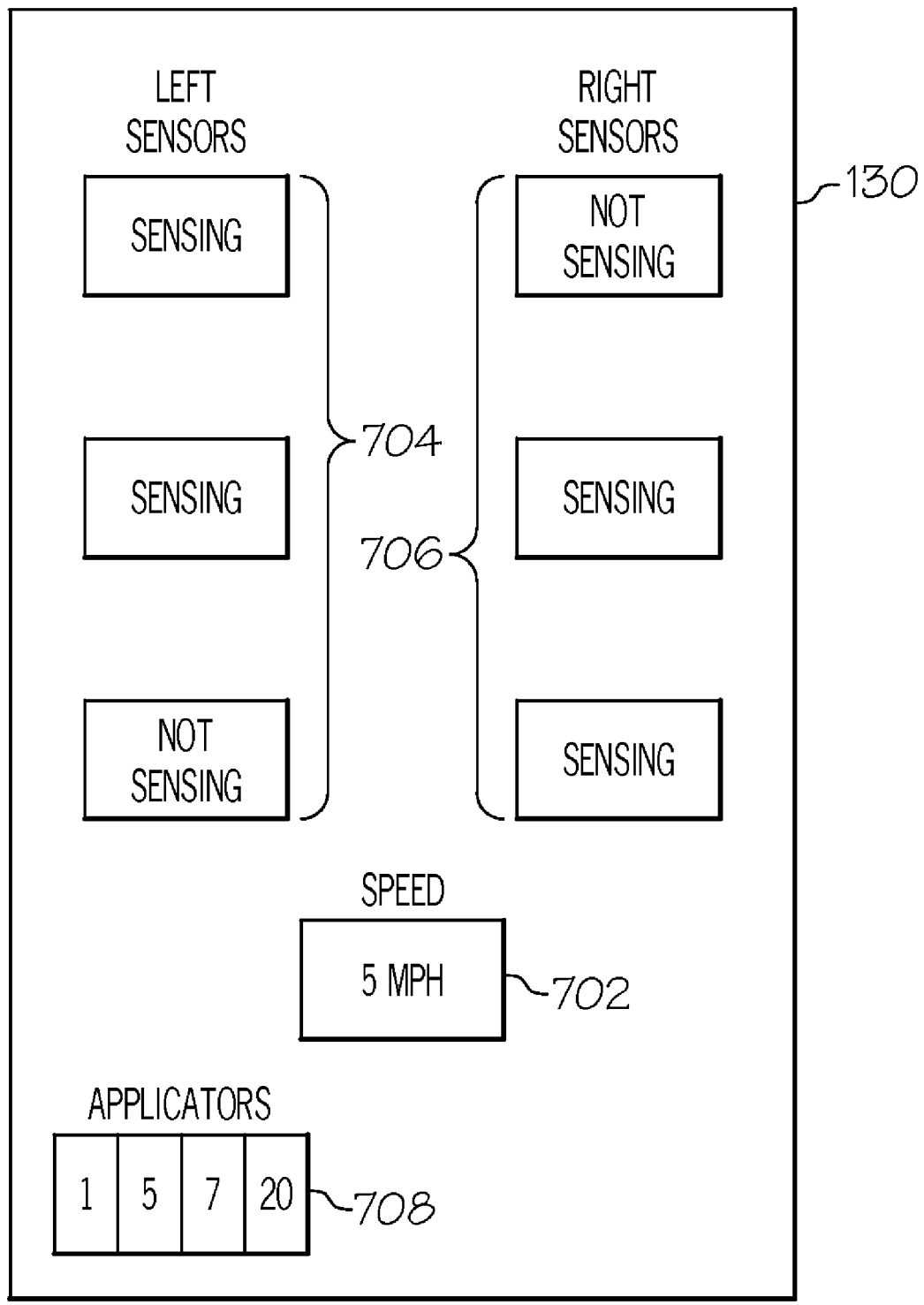
FIG. 7 shows another example of the applicator control interface on a wireless device according to one embodiment of the present invention.

In addition, the applicator manager 126 can transmit status information to the wireless device 104. For example, FIG. 7 shows another example of the applicator control interface 130. In particular, the applicator control interface 130 can display sensor connectivity information such as whether the system 102 is receiving GPS data 702 for the vehicle. Vegetation sensor input 704, 706 can be displayed that indicates whether sensors are working and whether or not a sensor is detecting vegetation. The applicator control interface 103 can also indicate which applicator unit, applicator set, and/or individual applicators 708 are current applying agrochemical. It should be noted that any type of visual, audible, and/or tactile indicators can be used to perform any of the indicators discussed above.

Operational Flows for Managing the Application of Agrochemicals to Vegetation

Figure 8:
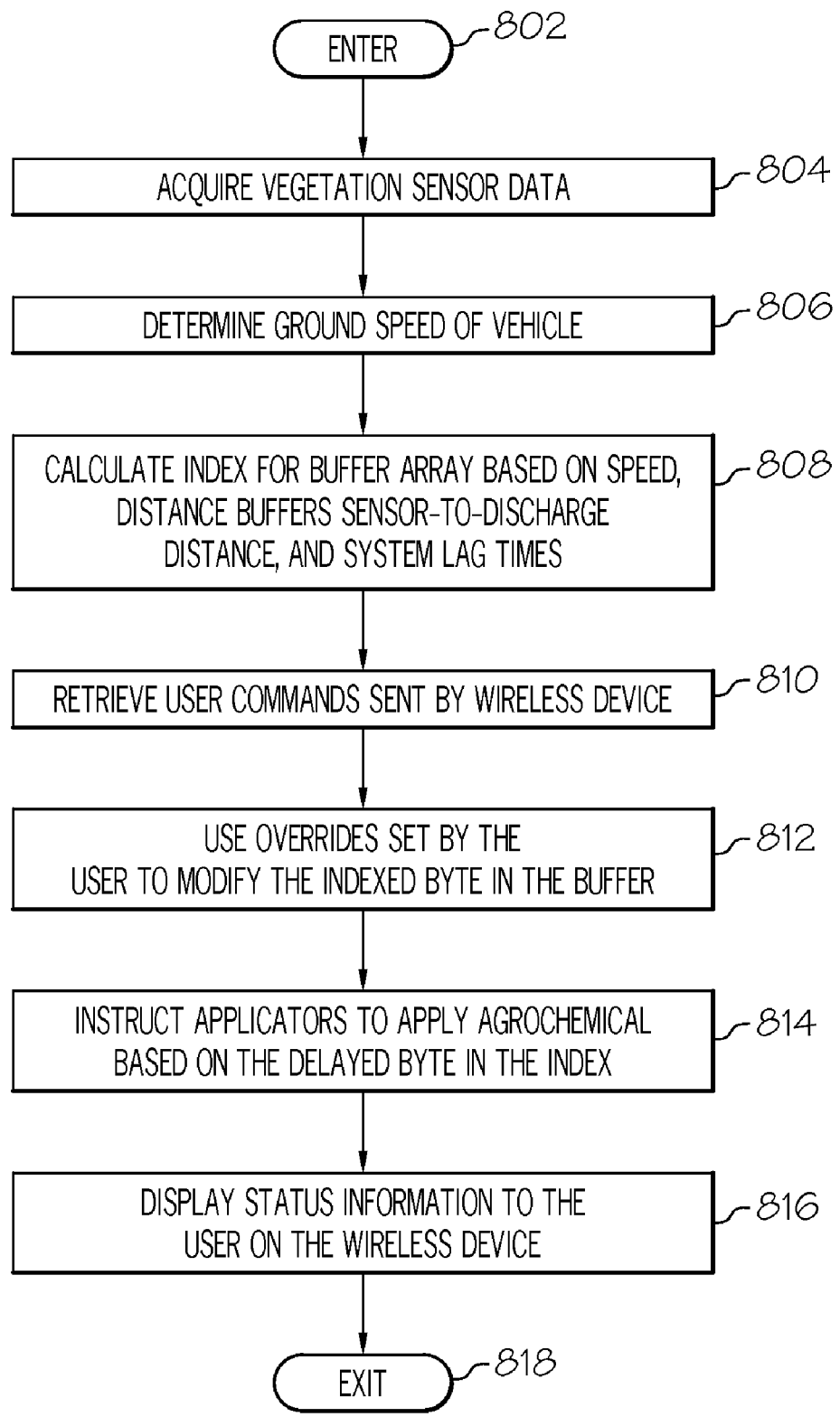
FIGS. 8-9 are operational flow diagrams illustrating various processes for managing the application of agrochemicals to vegetation according to one embodiment of the present invention.
Figure 9:
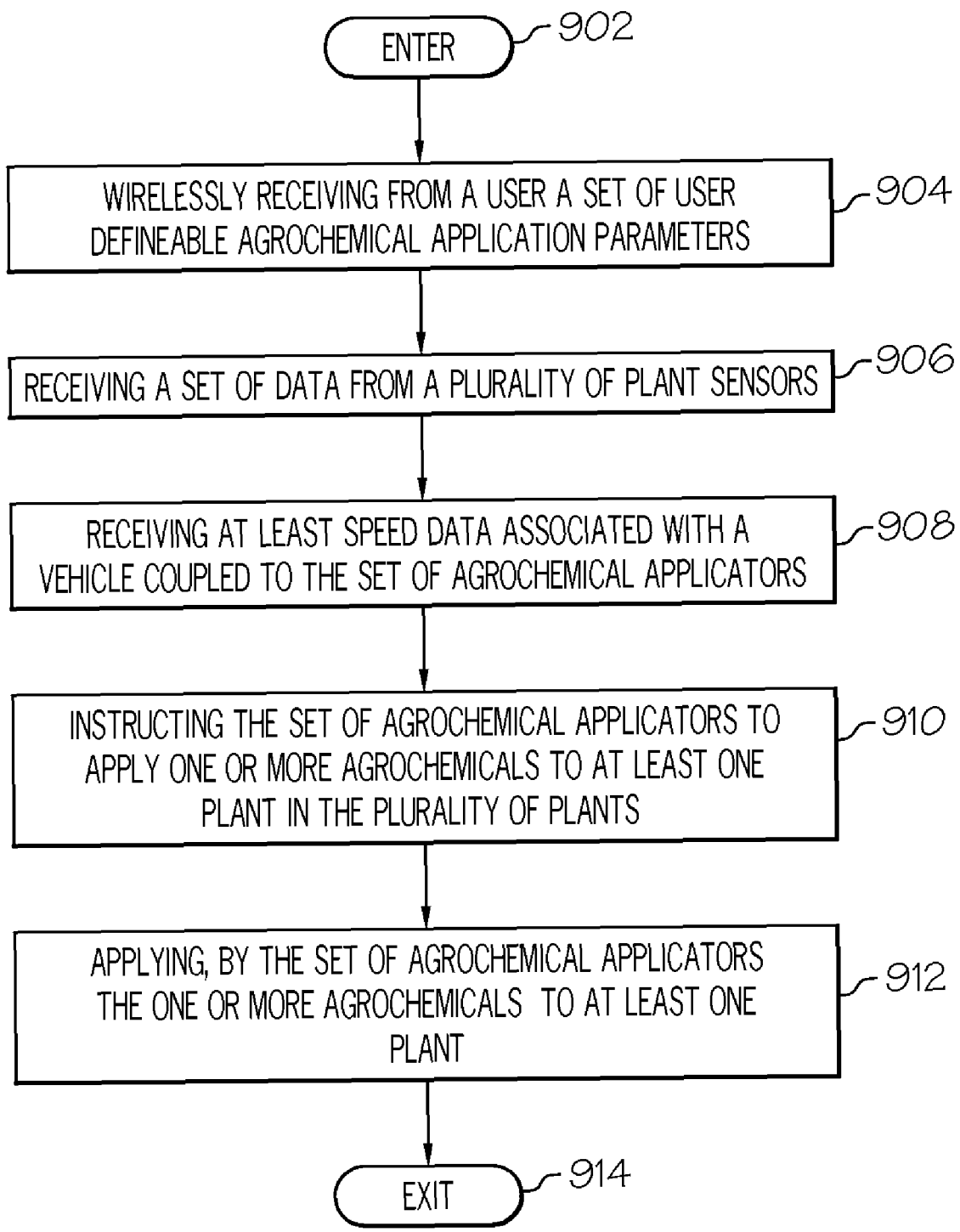

FIGS. 8-9 are operational flow diagrams illustrating various examples of managing the application of agrochemicals to vegetation. The operational flow diagram of FIG. 8 begins at step 802 and flows directly to step 804. The applicator manager 126, at step 804 acquires vegetation sensor data 114. The applicator manager 126, at step 806, determines the ground speed of the vehicle 108. The applicator manager 126, at step 808, calculates an index for the buffer array 602 comprising the vegetation sensor data based on speed, sensor-to-discharge distance, target overlap buffer distances, and system lag times. The applicator manager 126, at step 810, retrieves saved user commands previously sent by the wireless device 104 such as manual overrides, distance buffers, sensor-to-discharge distances, lag times, and the like.

The applicator manager 126, at step 812, uses the manual overrides and option parameters set by the user to modify the indexed byte in the buffer 602. The applicator manager 126, at step 814, instructs the applicators 120 A . . . Z to apply the agrochemicals to the plants based on the delayed byte in the index. The applicator manager 126, at step 816, wireless transmits status information to the user to be displayed on the wireless device 104. The control flow then exits at step 818.

The operational flow diagram of FIG. 9 begins at step 902 and flows directly to step 904. The applicator manager 126, at step 904, wireless receives a set of user defineable agrochemical application parameters from a user. The applicator manager 126, at step 906, receives a set of data from a plurality of plant sensors 112. The applicator manager 126, at step 908, receives at least speed data associated with a vehicle 108 coupled to a set of agrochemical applicators 120. The applicator manager 126, at step 910, instructs the set of agrochemical applicators 120 A . . . Z to at least one plant 334. The set of applicators 120, at step 912, applies the one or more agrochemicals to the at least one plant. The control flow then exits at step 914.

Information Processing System

Figure 10:
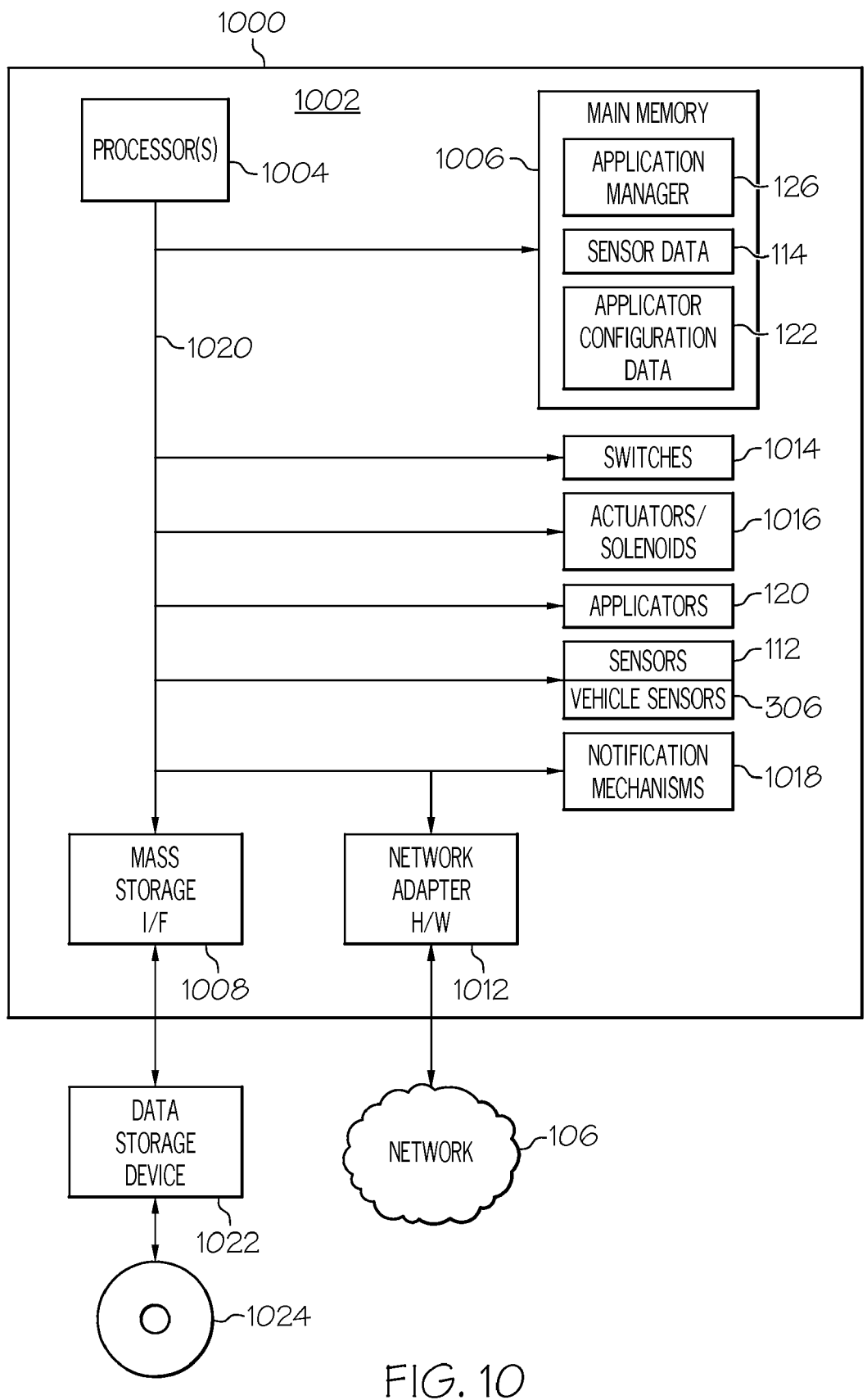
FIG. 10 is a block diagram illustrating a detailed view of an information processing system according to one embodiment of the present invention.

FIG. 10 is a block diagram illustrating a detailed view of an information processing system 1000 according to one embodiment of the present invention. The information processing system 1000 is based upon a suitably configured processing system adapted to implement the various embodiments of the present invention. Any suitably configured processing system is similarly able to be used as the information processing system 1000 by embodiments of the present invention such as a personal computer, workstation, or the like.

The information processing system 1000 includes a computer 1002. The computer 1002 has a processor(s) 1004 that is connected to a main memory 1006, mass storage interface 1008, network adapter hardware 1012, various switches 1014, applicator actuators/solenoid valves 1016, user notification mechanisms 1018, vegetation sensors 112, vehicle sensors 306, and applicators 120. The switches 1014 allow a user to enable/disable one or more sensors 112, 306 and/or applicators 120. The user notification mechanisms can include audible, visual, and/or tactile notification mechanisms that inform a user regarding which sensors/applicators are selected and the like.

A system bus 1020 interconnects these system components. The mass storage interface 1008 is used to connect mass storage devices, such as data storage device 1022, to the information processing system 1000. One specific type of data storage device is an optical drive such as a CD/DVD drive, which may be used to store data to and read data from a computer readable medium or storage product such as (but not limited to) a CD/DVD 1024. Another type of data storage device is a data storage device configured to support, for example, NTFS or FAT type file system operations.

The main memory 1006, in one embodiment, comprises the applicator manager 126, sensor data 114, and the application configuration data 124. Although illustrated as concurrently resident in the main memory 1006, it is clear that respective components of the main memory 1006 are not required to be completely resident in the main memory 1006 at all times or even at the same time. In one embodiment, the information processing system 1000 utilizes conventional virtual addressing mechanisms to allow programs to behave as if they have access to a large, single storage entity, referred to herein as a computer system memory, instead of access to multiple, smaller storage entities such as the main memory 1006 and data storage 1022. Note that the term "computer system memory" is used herein to generically refer to the entire virtual memory of the information processing system 1000.

Although only one CPU 1004 is illustrated for computer 1002, computer systems with multiple CPUs can be used equally effectively. Embodiments of the present invention further incorporate interfaces that each includes separate, fully programmed microprocessors that are used to off-load processing from the CPU 1004. An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 102. The network adapter hardware 1012 is used to provide a wired and/or wireless interface to a network 106. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 1024, CD ROM, or other form of recordable media, or via any type of electronic transmission mechanism.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for applying agrochemicals to plants, the method comprising:
   wirelessly receiving from a user a set of user definable agrochemical application parameters;
   receiving a set of data from a plurality of plant sensors, wherein the set of data includes at least positional data associated with a plurality of plants with respect to a set of agrochemical applicators;
   receiving at least speed data associated with a vehicle coupled to the set of agrochemical applicators;
   instructing the set of agrochemical applicators to apply one or more agrochemicals to at least one plant in the plurality of plants based at least on the set of user definable agrochemical application parameters that has been wirelessly received, the set of data from a plurality of plant sensors, and the speed data; and
   applying, by the set of agrochemical applicators, the one or more agrochemicals to at least one plant in response to the instructing.

2. The method of claim 1, wherein the set of user definable agrochemical application parameters is wirelessly received from a wireless handheld unit.

3. The method of claim 1, further comprising:
   disposing the plurality of plant sensors on a portion of the vehicle such that the plurality of plant sensors detect the plurality of plants prior to an applicator vehicle passing the plurality of plants, and wherein disposing the plurality of plant sensors on the portion of the vehicle allows multiple sensors in the set of agrochemical applicators to be controlled by a common variable rate application system.

4. The method of claim 1, wherein the set of user definable agrochemical application parameters include:
   a set of sensor-to-discharge parameters indicating a distance from at least one sensor in the plurality of plant sensors to at least one agrochemical applicator in the set of agrochemical applicators.

5. The method of claim 1, wherein the set of user definable agrochemical application parameters include:
   a set of applicator delay compensation parameters indicating a given amount of time to instruct the set of agrochemical applicators to apply the one or more agrochemicals to the at least one plant prior to the set of agrochemical applicators reaching the at least one plant.

6. The method of claim 1, wherein the set of user definable agrochemical application parameters include:
   a set of buffer distances indicating a given distance at least one of before and after at least one plant that the set of agrochemical applicators is to at least one of start and stop applying the at least one agrochemical to the at least one plant.

7. The method of claim 6, wherein the set of buffer distances are based on current environmental conditions.

8. The method of claim 1, further comprising:
storing the set of data received from the plurality of plant sensors in a buffer array.

9. The method of claim 8, further comprising:
determining an index associated with the buffer array based at least on the set of user definable agrochemical application parameters that has been wirelessly received, the set of data from a plurality of plant sensors, and the speed data.

10. The method of claim 9, further comprising:
identifying sensor data within the buffer array to use for instructing the set of agrochemical applicators to apply the one or more agrochemicals to the at least one plant based on the index that has been determined.

11. A system for applying agrochemicals to plants, the system comprising:
at least one vehicle;
a plurality of plant sensors mechanically coupled to the vehicle;
a set of vehicle sensors mechanically coupled to the vehicle;
a plurality of agrochemical applicators mechanically coupled to the vehicle and communicatively coupled to the plurality of plant sensors, wherein at least two applicators in the plurality of agrochemical applicators are controllable and configurable independent of each other; and
an applicator manager communicatively coupled to the plurality of plant sensors and the plurality of agrochemical applicators, wherein the applicator manager is configured to:
wirelessly receive from a user a set of user definable agrochemical application parameters;
receive a set of data from the plurality of plant sensors, wherein the set of data includes at least positional data associated with a plurality of plants with respect to a set of agrochemical applicators in the plurality of agrochemical applicators, and wherein the set of data further includes at least an indication of a beginning and an end of each plant in the plurality of plants;
receive at least speed data associated with the vehicle from the set of vehicle sensors;
storing the set of data received from the plurality of plant sensors in a buffer array;
determining an index associated with the buffer array based at least on the set of user definable agrochemical application parameters that has been wirelessly received, the set of data from the plurality of plant sensors, and the speed data;
identifying a set of sensor data within the buffer array associated with the index;
identifying at least one agrochemical applicator in the plurality of agrochemical applicators that is associated with the set of sensor data that has been identified;
calculating a time delay for instructing the at least one agrochemical applicator that has been identified to apply one or more agrochemicals to at least one plant in the plurality of plants that corresponds to the set of sensor data that has been identified; and
applying, by the at least one agrochemical applicator, the one or more agrochemicals to the at least one plant based on the time delay.

12. The system of claim 11, wherein the set of user definable agrochemical application parameters is wirelessly received from a wireless handheld unit.

13. The system of claim 11, wherein the plurality of plant sensors are disposed on a front portion of the vehicle such that the plurality of plant sensors detect the plurality of plants prior to an applicator vehicle comprising the plurality of agrochemical applicators passing the plurality of plants and wherein disposing the plurality of plant sensors on the portion of the vehicle allows multiple sensors in the set of agrochemical applicators to be controlled by a common variable rate application system.

14. The system of claim 11, wherein the set of user definable agrochemical application parameters include:
a set of sensor-to-discharge parameters indicating a distance from at least one sensor in the plurality of plant sensors to at least one agrochemical applicator in the set of agrochemical applicators.

15. The system of claim 11, wherein the set of user definable agrochemical application parameters include:
a set of applicator delay compensation parameters indicating a given amount of time to instruct the set of agrochemical applicators to apply the one or more agrochemicals to the at least one plant prior to the set of agrochemical applicators reaching the at least one plant.

16. The system of claim 11, wherein the set of user definable agrochemical application parameters include:
a set of buffer distances indicating a given distance at least one of before and after at least one plant that the set of agrochemical applicators is to at least one of start and stop applying the at least one agrochemical to the at least one plant.

17. A non-transitory computer program storage product for applying agrochemicals to plants, the computer program storage product comprising instructions for
wirelessly receiving from a user and storing a set of user definable agrochemical application parameters;
receiving a set of data from a plurality of plant sensors, wherein the set of data includes at least positional data associated with a plurality of plants with respect to a set of agrochemical applicators, and wherein the set of data further includes at least an indication of a beginning and an end of each plant in the plurality of plants;
receiving at least speed data associated with a vehicle coupled to the set of agrochemical applicators;
instructing the set of agrochemical applicators to apply one or more agrochemicals to at least one plant in the plurality of plants based at least on the set of user definable agrochemical application parameters that has been wirelessly received, the set of data from a plurality of plant sensors, and the speed data; and
applying, by the set of agrochemical applicators, the one or more agrochemicals to at least one plant in response to the instructing.

18. The non-transitory computer program storage product of claim 17, wherein the set of user definable agrochemical application parameters is wirelessly received from a wireless handheld unit.

19. The non-transitory computer program storage product of claim 17, wherein the set of user definable agrochemical application parameters include:
a set of sensor-to-discharge parameters indicating a distance from at least one sensor in the plurality of plant sensors to at least one agrochemical applicator in the set of agrochemical applicators.

20. The non-transitory computer program storage product of claim 17, wherein the set of user definable agrochemical application parameters include at least one of:

a set of applicator delay compensation parameters indicating a given amount of time to instruct the set of agrochemical applicators to apply the one or more agrochemicals to the at least one plant prior to the set of agrochemical applicators reaching the at least one plant; and a set of buffer distances indicating a given distance at least one of before and after at least one plant that the set of agrochemical applicators is to at least one of start and stop applying the at least one agrochemical to the at least one plant.

* * * * *